(12) United States Patent
Baba

(10) Patent No.: US 11,693,607 B2
(45) Date of Patent: Jul. 4, 2023

(54) RECORDING MATERIAL TRANSPORT SYSTEM, RECORDING MATERIAL TRANSPORT APPARATUS, AND IMAGE FORMING APPARATUS WITH STOPPED TRANSPORT NOTIFICATION

(71) Applicant: FUJIFILM BUSINESS INNOVATION CORP., Tokyo (JP)

(72) Inventor: Atsuya Baba, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 534 days.

(21) Appl. No.: 16/782,883

(22) Filed: Feb. 5, 2020

(65) Prior Publication Data

US 2021/0089241 A1 Mar. 25, 2021

(30) Foreign Application Priority Data

Sep. 20, 2019 (JP) .................................. 2019-171913

(51) Int. Cl.
*G06F 3/12* (2006.01)
*G03G 15/00* (2006.01)

(52) U.S. Cl.
CPC ........... *G06F 3/121* (2013.01); *G03G 15/502* (2013.01); *G03G 15/6523* (2013.01); *G03G 15/6532* (2013.01); *G03G 15/70* (2013.01); *G06F 3/1234* (2013.01); *G03G 2215/00548* (2013.01)

(58) Field of Classification Search
None
See application file for complete search history.

(56) References Cited

U.S. PATENT DOCUMENTS

| 8,532,505 B2 | 9/2013 | Harada | |
|---|---|---|---|
| 2011/0217050 A1* | 9/2011 | Harada | G06K 15/408 399/9 |
| 2014/0167345 A1* | 6/2014 | Maeda | B65H 43/00 271/3.14 |

FOREIGN PATENT DOCUMENTS

JP 2011-178109 A 9/2011

* cited by examiner

*Primary Examiner* — Andrew H Lam
(74) *Attorney, Agent, or Firm* — Oliff PLC

(57) ABSTRACT

A recording material transport system includes a first transport apparatus including a transport unit that transports a recording material and a notification unit that notifies a user about how to deal with a recording material whose transport has been stopped; and a second transport apparatus including a transport unit that transports a recording material transported from the first transport apparatus and a notification unit that notifies the user about how to deal with a recording material whose transport has been stopped, wherein in a case where a recording material has stopped in both of the first and second transport apparatus, the notification unit of the first transport apparatus notifies the user about how to deal with the recording material in the first transport apparatus, and the notification unit of the second transport apparatus notifies the user about how to deal with the recording material in the second transport apparatus.

18 Claims, 6 Drawing Sheets

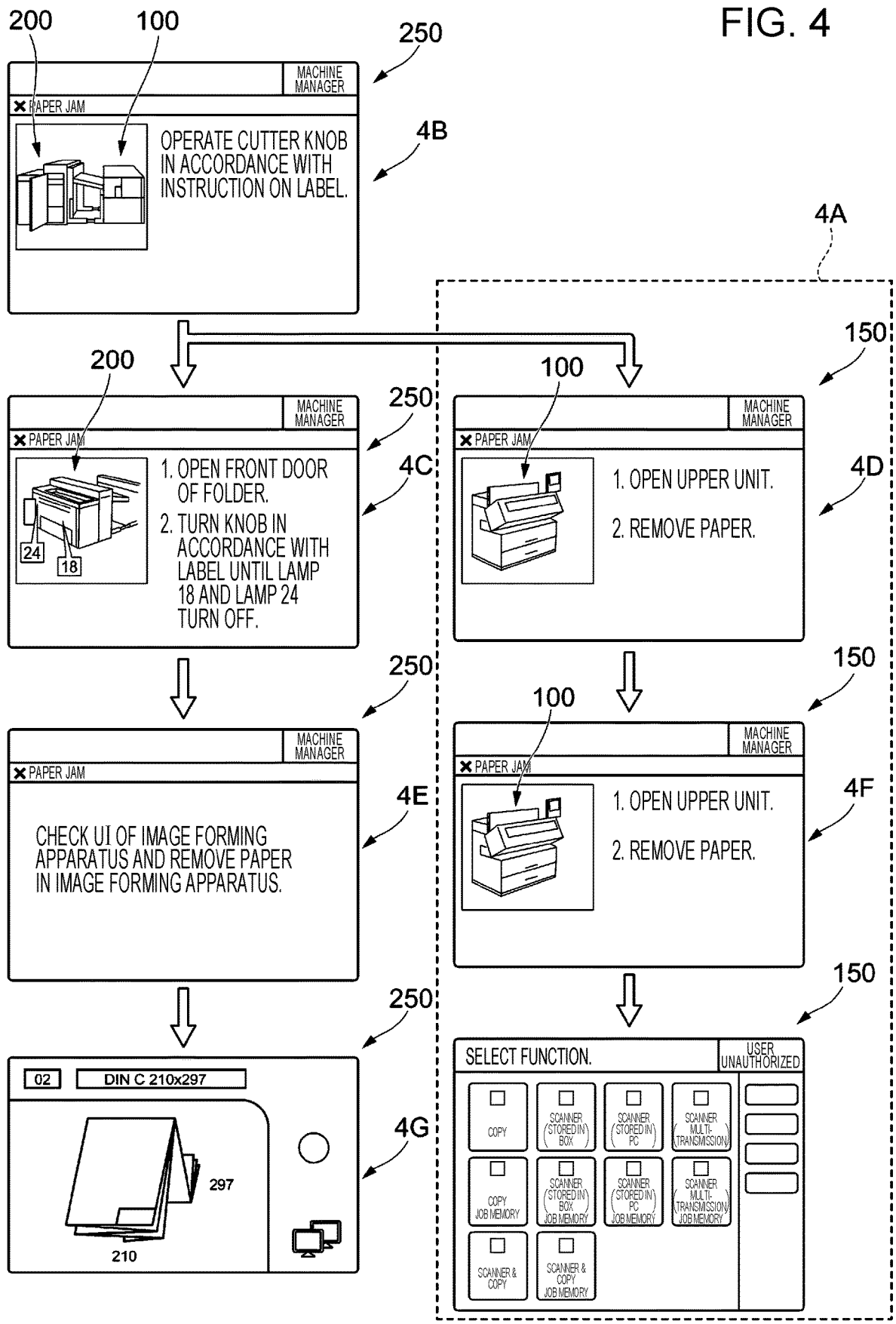

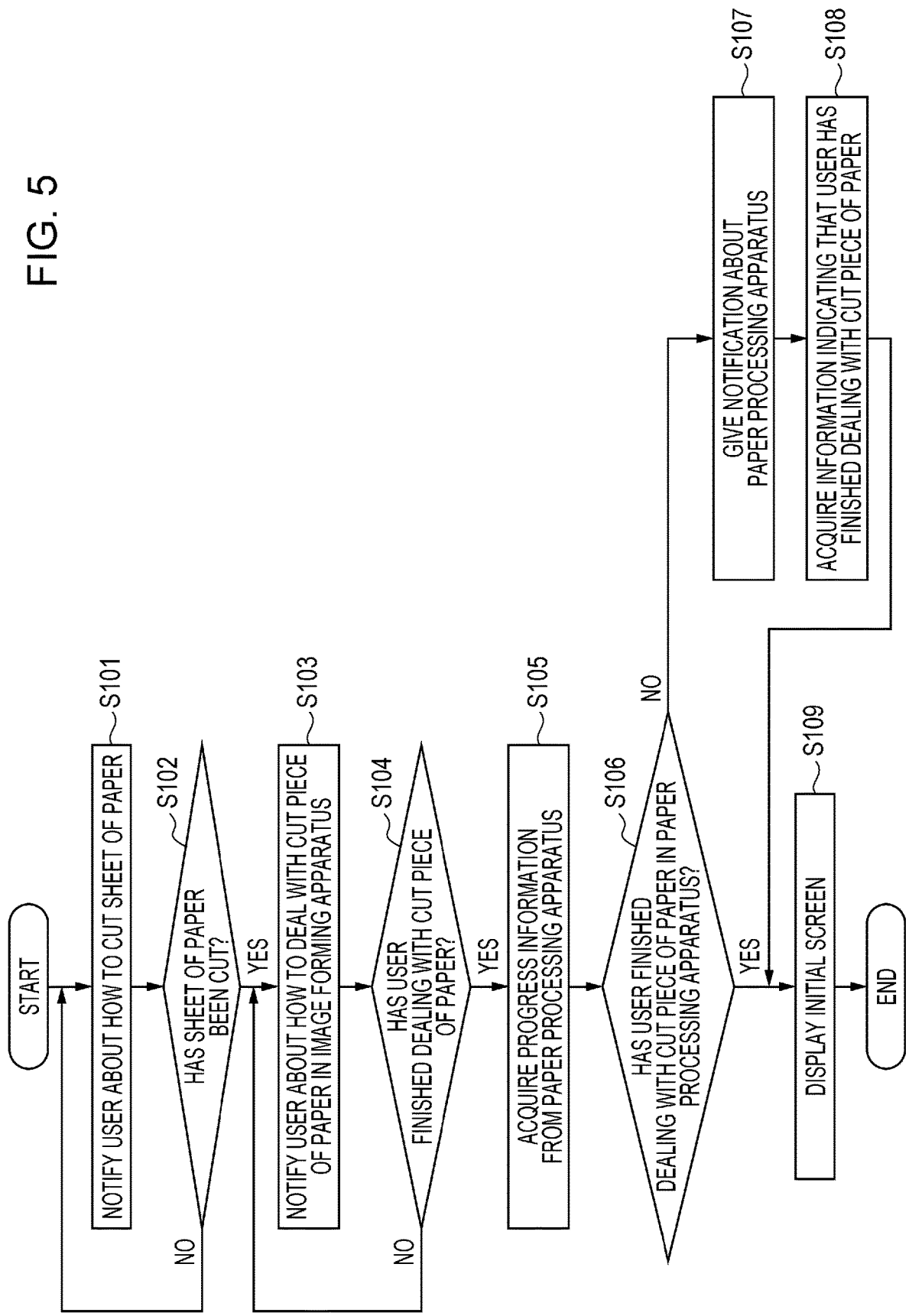

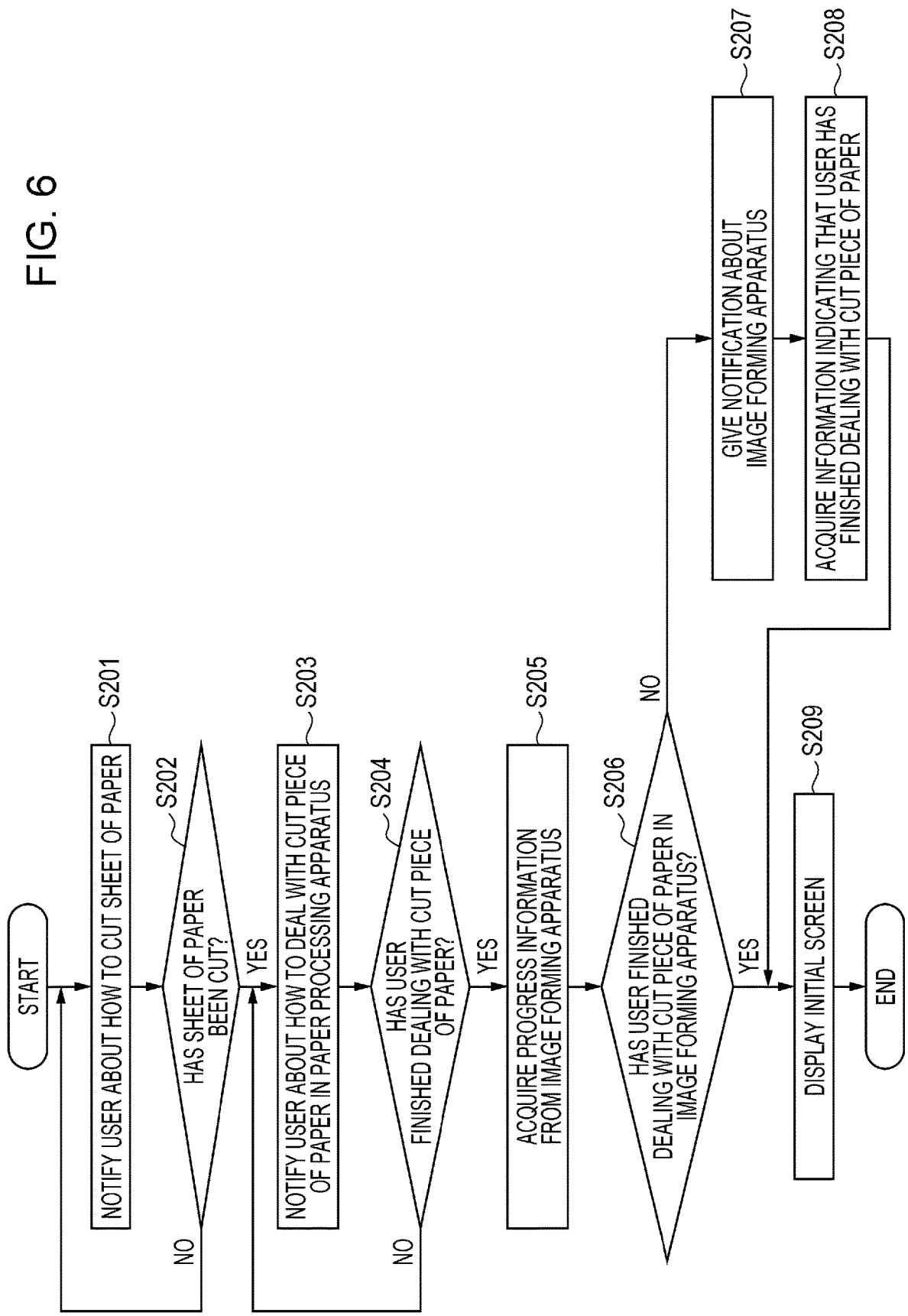

RECORDING MATERIAL TRANSPORT SYSTEM, RECORDING MATERIAL TRANSPORT APPARATUS, AND IMAGE FORMING APPARATUS WITH STOPPED TRANSPORT NOTIFICATION

CROSS-REFERENCE TO RELATED APPLICATIONS

This application is based on and claims priority under 35 USC 119 from Japanese Patent Application No. 2019-171913 filed Sep. 20, 2019.

BACKGROUND

(i) Technical Field

The present disclosure relates to a recording material transport system, a recording material transport apparatus, and an image forming apparatus.

(ii) Related Art

Japanese Unexamined Patent Application Publication No. 2011-178109 discloses displaying information on how to recover from an error on an I/F when it is determined that a job that is input to a print system and is associated is not finished and thereby notifying a printer about error occurrence information.

SUMMARY

In a case where plural transport devices are provided and a recording material is transported via these transport devices, a recording material whose transport has been stopped is sometimes stretched over these transport devices.

In this case, an operator can be notified about how to deal with this recording material, for example, on the basis of information on how to deal with this recording material displayed on a single screen. In this case, the single screen contains a lot of information. This makes it hard for the operator to grasp what kind of action should be taken.

Aspects of non-limiting embodiments of the present disclosure relate to improving workability of an operator who deals with a recording material that has been stopped in a case where the recording material is stretched over plural transport apparatuses as compared with a case where the operator is notified about how to deal with such a recording material on the basis of information displayed on a single screen.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a recording material transport system including a first transport apparatus including a transport unit that transports a recording material and a notification unit that notifies a user about how to deal with a recording material whose transport by the transport unit has been stopped; and a second transport apparatus including a transport unit that transports a recording material transported from the first transport apparatus and a notification unit that notifies the user about how to deal with a recording material whose transport by the transport unit has been stopped, wherein in a case where a recording material that has stopped is present in both of the first transport apparatus and the second transport apparatus, the notification unit of the first transport apparatus notifies the user about how to deal with the recording material in the first transport apparatus, and the notification unit of the second transport apparatus notifies the user about how to deal with the recording material in the second transport apparatus.

BRIEF DESCRIPTION OF THE DRAWINGS

An exemplary embodiment of the present disclosure will be described in detail based on the following figures, wherein:

FIG. 4 is a view for explaining what is displayed on a display device of the paper processing apparatus;

FIG. 5 is a flowchart illustrating flow of processing performed by the control device of the image forming apparatus; and FIG. 6 is a flowchart illustrating flow of processing performed by the control device of the paper processing apparatus.

DETAILED DESCRIPTION

An exemplary embodiment of the present disclosure is described below with reference to the attached drawings.

Figure 1:
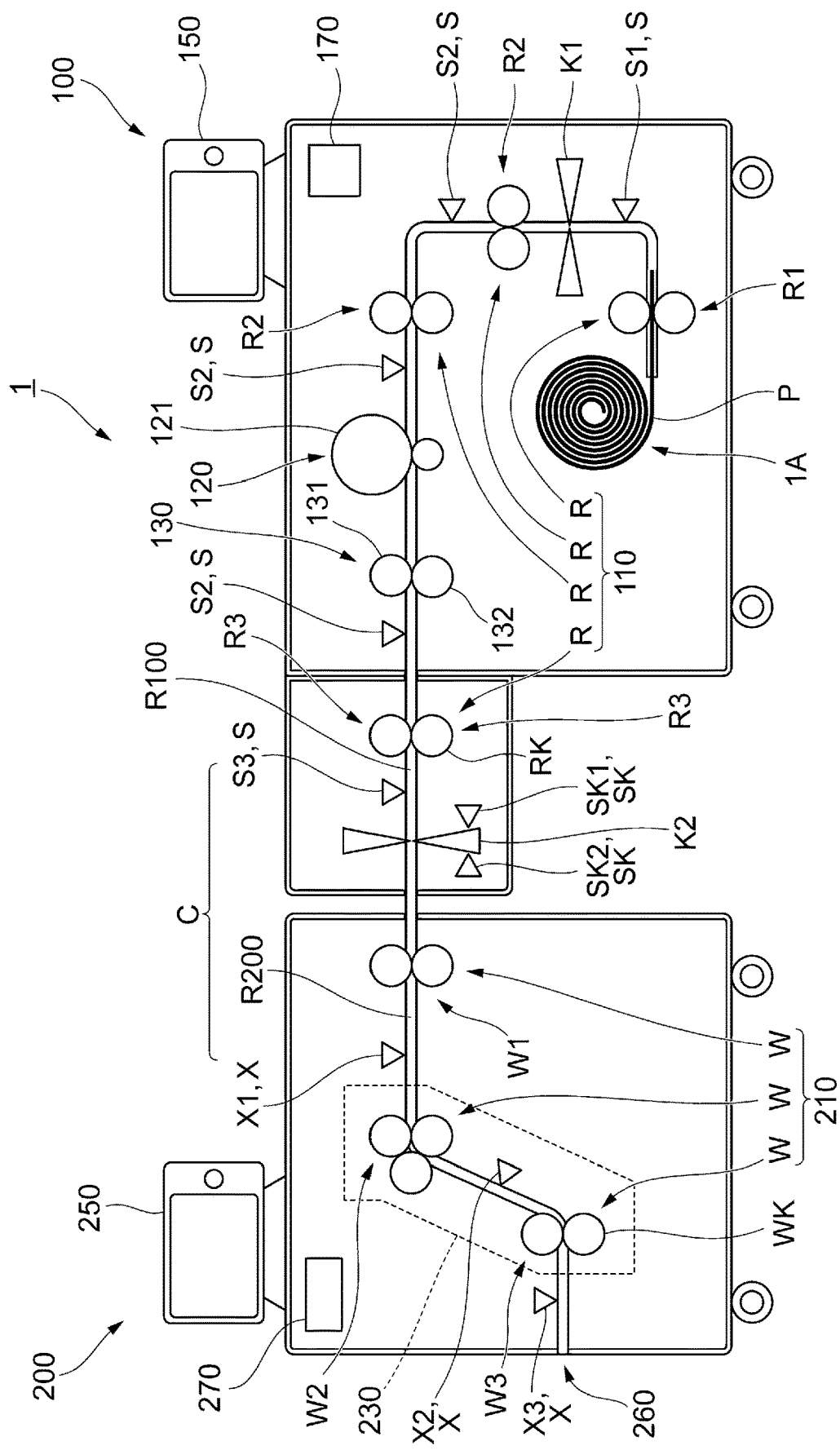
FIG. 1 illustrates an example of a configuration of a paper processing system viewed from a front side of the paper processing system.

FIG. 1 illustrates an example of a configuration of a paper processing system 1 viewed from a front side of the paper processing system 1.

The paper processing system 1 illustrated in FIG. 1 includes an image forming apparatus 100 and a paper processing apparatus 200 that follows the image forming apparatus 100.

In the paper processing system 1, the image forming apparatus 100 and the paper processing apparatus 200 are connected to each other, and a job is executed by using the image forming apparatus 100 and the paper processing apparatus 200.

In other words, in the paper processing system 1, in which plural jobs are sequentially executed one by one, each job is executed by using the image forming apparatus 100 and the paper processing apparatus 200.

In the paper processing system 1 according to the present exemplary embodiment, a sheet of paper P, which is an example of a recording material, is transported via the image forming apparatus 100 and the paper processing apparatus 200. That is, the paper processing system 1 according to the present exemplary embodiment can be also regarded as a recording material transport system.

In the present exemplary embodiment, the image forming apparatus 100 located on an upstream side in a direction in which a sheet of paper P is transported can be regarded as a first transport apparatus, and the paper processing apparatus 200 located on a downstream side in the direction in which a sheet of paper P is transported can be regarded as a second transport apparatus.

Furthermore, in the present exemplary embodiment, the image forming apparatus 100 and the paper processing apparatus 200 each can be regarded as a recording material transport apparatus.

The image forming apparatus 100 forms an image on a sheet of paper P, which is an example of a recording material.

The paper processing apparatus 200, which is an example of a succeeding apparatus, performs processing on a sheet of paper P transported from the image forming apparatus 100.

Specifically, the paper processing apparatus 200 performs folding processing on a sheet of paper P delivered from the image forming apparatus 100 and thereby generates a folded sheet of paper P.

The folding processing is an example, and the paper processing apparatus 200 may perform other kinds of processing such as binding processing, booklet creating processing, or punching processing.

Alternatively, the paper processing apparatus 200 may just transport a sheet of paper P to another succeeding apparatus. That is, examples of the processing performed by the paper processing apparatus 200 include transport of a sheet of paper P.

The image forming apparatus 100 has a transport unit 110 that transports a sheet of paper P. Furthermore, the image forming apparatus 100 has plural paper detection sensors S that detect a sheet of paper P transported by the transport unit 110.

The transport unit 110, which is an example of a transport unit, transports a sheet of paper P and delivers the sheet of paper P to the paper processing apparatus 200, which is a succeeding apparatus. In particular, the transport unit 110 transports a sheet of paper P and supplies the sheet of paper P to the paper processing apparatus 200, which is a succeeding apparatus.

The transport unit 110 has plural transport roll pairs R. A driving roll RK, which is one of rolls that constitute each of the transport roll pairs R, is driven to transport a sheet of paper P to a downstream side. In this way, the sheet of paper P is delivered to the paper processing apparatus 200.

In the present exemplary embodiment, the transport roll pairs R include an upstream transport roll pair R1 that is on a most upstream side, a downstream transport roll pair R3 that is on a most downstream side, and two intermediate transport roll pairs R2 disposed between the upstream transport roll pair R1 and the downstream transport roll pair R3.

In the image forming apparatus 100 according to the present exemplary embodiment, a roll of paper P indicated by reference sign 1A is sequentially cut by a paper cutter K1 into a rectangular sheet of paper P, and this rectangular sheet of paper P is sequentially fed to the transport unit 110.

The transport unit 110 transports this rectangular sheet of paper P to a downstream side and then to the paper processing apparatus 200.

Although an example in which a roll of paper P is set in the image forming apparatus 100 has been described in the present exemplary embodiment, this configuration is not restrictive. Sheets of cut paper that have been cut in advance may be sequentially fed to the transport unit 110.

The plural paper detection sensors S are disposed apart from one another in a paper transport direction.

More specifically, in the present exemplary embodiment, the paper detection sensors S include an upstream paper detection sensor S1 that is on a most upstream side and a downstream paper detection sensor S3 that is on a most downstream side. Furthermore, three intermediate paper detection sensors S2 are provided between the upstream paper detection sensor S1 and the downstream paper detection sensor S3.

Furthermore, the image forming apparatus 100 according to the present exemplary embodiment has an image forming unit 120 that forms an image on a sheet of paper P transported by the transport unit 110.

Furthermore, the image forming apparatus 100 has a fixing unit 130 that fixes an image formed on a sheet of paper P by the image forming unit 120 onto the sheet of paper P.

The image forming unit 120, which is an example of an image forming unit, forms an image on a sheet of paper P according to an electrophotographic system.

The image forming unit 120 has a photoconductor drum 121, which is an example of an image carrier. The image forming unit 120 forms a toner image on the photoconductor drum 121 through exposure on the photoconductor drum 121 and development using toner.

Then, this image formed on the photoconductor drum 121 is transferred onto the sheet of paper P transported by the transport unit 110. In this way, the image is formed on the sheet of paper P.

Note that a method for forming an image on a sheet of paper P is not limited to this. An image may be formed on a sheet of paper P by using other systems such as an inkjet system.

The fixing unit 130 fixes the image on the sheet of paper P transported through the image forming unit 120 onto this sheet of paper P by applying pressure and heat to the sheet of paper P.

More specifically, the fixing unit 130 has a first roll 131 provided with a heat source (not illustrated) and a second roll 132 pressed against the first roll 131. The first roll 131 and the second roll 132 hold a sheet of paper P therebetween and thereby fix an image on the sheet of paper P onto this sheet of paper P.

Furthermore, the image forming apparatus 100 has a cutting blade K2 used to cut a sheet of paper P and cutting blade detection sensors SK that detect the cutting blade K2.

The cutting blade K2 is disposed on a downstream side relative to the fixing unit 130 in a direction in which a sheet of paper P is transported. More specifically, the cutting blade K2 is disposed in a connection part C in which the image forming apparatus 100 and the paper processing apparatus 200 are connected.

In the present exemplary embodiment, the "connection part C" is not limited to a contact part at which the image forming apparatus 100 and the paper processing apparatus 200 are in direct contact with each other and also includes a part around the contact part. In particular, the "connection part C" includes a part of the image forming apparatus 100 that is on an upstream side relative to the contact part and a part of the paper processing apparatus 200 that is on a downstream side relative to the contact part.

The cutting blade K2 is movable in a direction orthogonal to the paper on which FIG. 1 is drawn. In other words, the cutting blade K2 is movable in a direction that crosses the paper on which FIG. 1 is drawn.

In particular, the cutting blade K2 is movable in a direction orthogonal to the direction in which a sheet of paper P is transported. In other words, the cutting blade K2 is movable in a direction that crosses the direction in which a sheet of paper P is transported.

More specifically, the cutting blade K2 is movable from a rear side to a front side of the image forming apparatus 100 and from the front side to the rear side of the image forming apparatus 100.

In the present exemplary embodiment, the sheet of paper P is cut by moving the cutting blade K2 from the rear side to the front side of the image forming apparatus 100 or the sheet of paper P is cut by moving the cutting blade K2 from the front side to the rear side of the image forming apparatus 100.

The cutting blade detection sensors SK include two cutting blade detection sensors SK, one of which is a cutting blade detection sensor SK1 provided on the rear side of the image forming apparatus 100, and the other one of which is a cutting blade detection sensor SK2 provided on the front side of the image forming apparatus 100.

In the present exemplary embodiment, the cutting blade K2 moves when cutting the sheet of paper P. The movement causes a shift from a state where the cutting blade K2 is being detected by the cutting blade detection sensor SK1 to a state where the cutting blade K2 is being detected by the cutting blade detection sensor SK2. Alternatively, the movement causes a shift from a state where the cutting blade K2 is being detected by the cutting blade detection sensor SK2 to a state where the cutting blade K2 is being detected by the cutting blade detection sensor SK1.

In the present exemplary embodiment, it is determined whether or not a sheet of paper P has been cut by the cutting blade K2 based on output from the two cutting blade detection sensors SK.

In particular, in the present exemplary embodiment, it is determined that a sheet of paper P has been cut by the cutting blade K2 in a case where there occurs a shift from a state where the cutting blade K2 is being detected by the cutting blade detection sensor SK1 to a state where the cutting blade K2 is being detected by the cutting blade detection sensor SK2 or a shift from a state where the cutting blade K2 is being detected by the cutting blade detection sensor SK2 to a state where the cutting blade K2 is being detected by the cutting blade detection sensor SK1.

Furthermore, the image forming apparatus 100 according to the present exemplary embodiment has a display device 150, which is an example of a notification unit used to notify a user about information.

Furthermore, in the present exemplary embodiment, a control device 170 that controls each unit of the image forming apparatus 100 is provided.

Next, the paper processing apparatus 200 is described.

The paper processing apparatus 200 has a transport unit 210 that transports a sheet of paper P transported from the image forming apparatus 100.

The transport unit 210, which is an example of a transport unit, has plural transport roll pairs W. A driving roll WK, which is one of rolls that constitute each of the transport roll pairs W, is driven to transport the sheet of paper P to a downstream side.

In the present exemplary embodiment, the transport roll pairs W include an upstream transport roll pair W1 that is on a most upstream side and a downstream transport roll pair W3 that is on a most downstream side.

Furthermore, a single intermediate transport roll pair W2 is disposed between the upstream transport roll pair W1 and the downstream transport roll pair W3.

Furthermore, the paper processing apparatus 200 has a folding mechanism 230 that folds a sheet of paper P.

The folding mechanism 230 has a pressed member (not illustrated) that is pressed against the sheet of paper P. By pressing the pressed member against the sheet of paper P, the sheet of paper P is folded.

Furthermore, the paper processing apparatus 200 has a display device 250, which is an example of a notification unit used to notify a user about information.

Furthermore, the paper processing apparatus 200 has a control device 270 that controls each unit of the paper processing apparatus 200.

In the present exemplary embodiment, the whole paper processing system 1 is controlled through communication between the control device 170 of the image forming apparatus 100 and the control device 270 of the paper processing apparatus 200.

Furthermore, the paper processing apparatus 200 has a paper output unit 260 from which a sheet of paper P that has been folded is output.

Furthermore, the paper processing apparatus 200 has plural paper detection sensors X that detect a sheet of paper P transported by the transport unit 210. The paper detection sensors X are disposed apart from one another in a direction in which a sheet of paper P is transported.

More specifically, in the present exemplary embodiment, the paper detection sensors X include an upstream paper detection sensor X1 that is on a most upstream side and a downstream paper detection sensor X3 that is on a most downstream side. Furthermore, a single intermediate paper detection sensor X2 is provided between the upstream paper detection sensor X1 and the downstream paper detection sensor X3.

Furthermore, in the present exemplary embodiment, the image forming apparatus 100 and the paper processing apparatus 200 each have an opening closing member (not illustrated) that is openable and closable.

This opening closing member also serves as an exterior member on an outer surface of each of the image forming apparatus 100 and the paper processing apparatus 200.

In the present exemplary embodiment, a user can check the transport unit 110, the cutting blade K2, a path R100 on which a sheet of paper P is transported, and other members provided in the image forming apparatus 100 by opening the opening and closing member of the image forming apparatus 100.

Furthermore, a user can check the transport unit 210 and a path R200 on which a sheet of paper P is transported in the paper processing apparatus 200 by opening the opening closing member of the paper processing apparatus 200.

Furthermore, the image forming apparatus 100 and the paper processing apparatus 200 each have an opening closing detection sensor (not illustrated) that detects opening and closing of the opening closing member.

Hereinafter, the transport unit 110 provided in the image forming apparatus 100 is referred to as an upstream-side transport unit 110, and the transport unit 210 provided in the paper processing apparatus 200 is referred to as a downstream-side transport unit 210.

Figure 2:
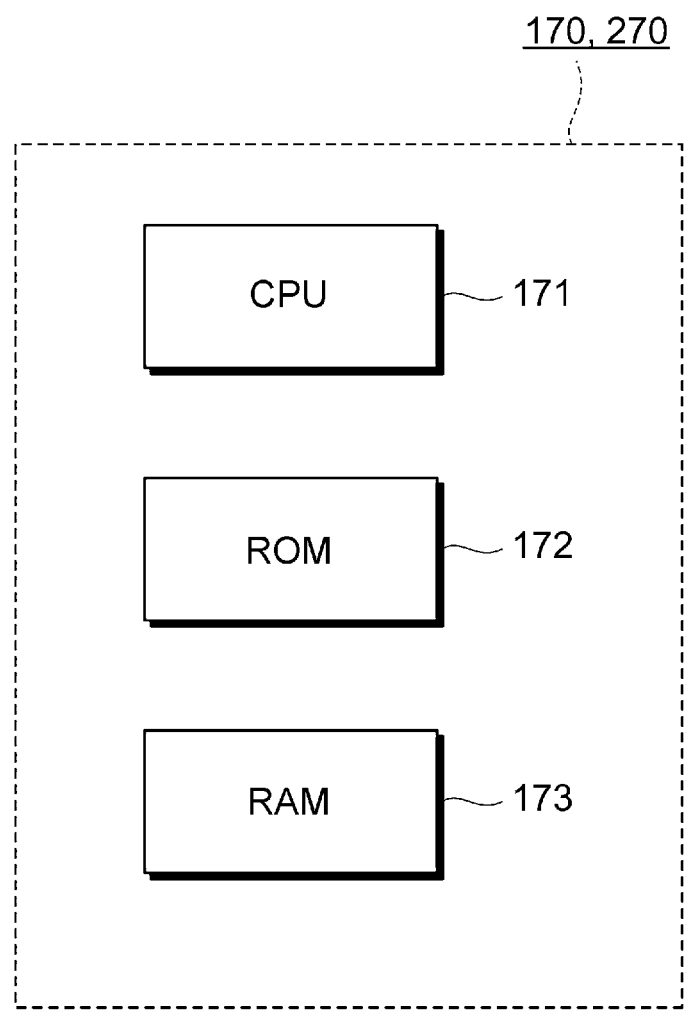
FIG. 2 illustrates an example of a configuration of a control device provided in an image forming apparatus and a control device provided in a paper processing apparatus.

FIG. 2 illustrates an example of a configuration of the control device 170 of the image forming apparatus 100 and the control device 270 of the paper processing apparatus 200.

The control device 170 and the control device 270 each include a central processing unit (CPU) 171, which is an example of a processor, a read only memory (ROM) 172 in which a control program and the like are stored, and a random access memory (RAM) 173 used as a work area. This control device 170 and the control device 270 are computers.

Figure 3:
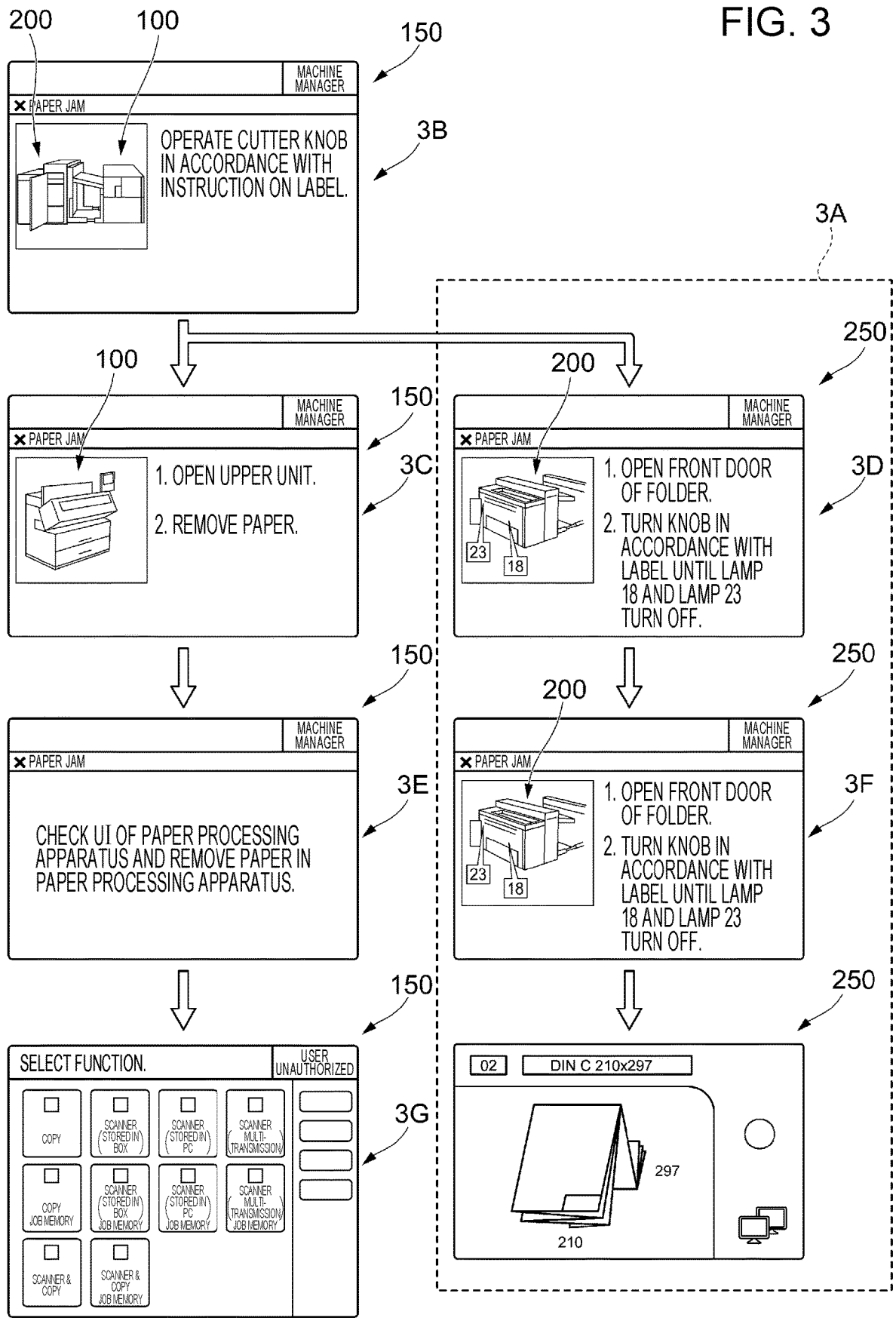
FIG. 3 is a view for explaining what is displayed on a display device of the image forming apparatus.

FIG. 3 is a view for explaining what is displayed on the display device 150 of the image forming apparatus 100.

FIG. 3 is a view for explaining what is displayed in a case where a sheet of paper P that has been stopped in the image forming apparatus 100 is dealt with (details will be described later) before a sheet of paper P that has been stopped in the paper processing apparatus 200 is dealt with.

In FIG. 3, what is displayed on the display device 250 of the paper processing apparatus 200 is also illustrated (see reference sign 3A).

In particular, what is displayed on the display device 150 of the image forming apparatus 100 is illustrated on the left side of FIG. 3, and what is displayed on the display device 250 of the paper processing apparatus 200 is illustrated on the right side of FIG. 3.

In the present exemplary embodiment, transport of a sheet of paper P by the upstream-side transport unit 110 and the downstream-side transport unit 210 is sometimes stopped when the sheet of paper P is present in both of the image forming apparatus 100 and the paper processing apparatus 200.

In this case, in the present exemplary embodiment, first, a screen indicated by reference sign 3B is displayed on the display device 150 of the image forming apparatus 100. On this screen, a user is notified about how to cut the sheet of paper P that is present in both of the image forming apparatus 100 and the paper processing apparatus 200.

Although an example in which various notification are given to the user on the display device 150 and the display device 250 is described in the present exemplary embodiment, a way in which the user is notified about information is not limited to this. For example, various notifications may be given to the user by voice output from a speaker (not illustrated).

In a case where a sheet of paper P that has been stopped is present in both of the image forming apparatus 100 and the paper processing apparatus 200, the same screen as the screen indicated by reference sign 3B is also displayed (not illustrated in FIG. 3) on the display device 250 of the paper processing apparatus 200 to notify the user about how to cut the sheet of paper P.

In particular, in the present exemplary embodiment, in a case where a sheet of paper P that has been stopped is present in both of the image forming apparatus 100 and the paper processing apparatus 200, a user is notified on both of the image forming apparatus 100 and the paper processing apparatus 200 about how to cut the sheet of paper P.

Although a user is notified on both of the image forming apparatus 100 and the paper processing apparatus 200 about how to cut the sheet of paper P in the present exemplary embodiment as described above, a user may be notified on only one of the image forming apparatus 100 and the paper processing apparatus 200 about how to cut the sheet of paper P.

The user is notified about how to cut the sheet of paper P on the basis of a predetermined image (see reference sign 3B in FIG. 3).

More specifically, the user is notified about how to cut the sheet of paper P on the screen on which an image showing the image forming apparatus 100 and the paper processing apparatus 200 and showing which exterior member should be opened and a specific procedure for cutting the sheet of paper P are displayed.

In the present exemplary embodiment, a jam of a sheet of paper P can occur in the image forming apparatus 100 and the paper processing apparatus 200. Upon detection of the jam of the sheet of paper P, transport of a sheet of paper P by the upstream-side transport unit 110 and the downstream-side transport unit 210 is stopped.

In particular, in the present exemplary embodiment, the paper detection sensors S are provided for detection of a sheet of paper P in the image forming apparatus 100, and the paper detection sensors X are provided for detection of a sheet of paper P in the paper processing apparatus 200.

For example, in a case where a sheet of paper P is not detected in the image forming apparatus 100 or the paper processing apparatus 200 at a timing at which the sheet of paper P is scheduled to be detected, the control device 170 of the image forming apparatus 100 or the control device 270 of the paper processing apparatus 200 determines that a jam of the sheet of paper P has occurred.

In this case, information indicating that a jam of the sheet of paper P has occurred is transmitted from one control device that has determined that a jam of the sheet of paper P has occurred to the other control device.

In this case, the control device 170 supplies a control signal to the upstream-side transport unit 110 to stop transport of the sheet of paper P by the upstream-side transport unit 110.

The control device 270 supplies a control signal to the downstream-side transport unit 210 to stop transport of the sheet of paper P by the downstream-side transport unit 210.

In the present exemplary embodiment, in a case where a sheet of paper P whose transport by the upstream-side transport unit 110 and the downstream-side transport unit 210 has been stopped is present in both of the image forming apparatus 100 and the paper processing apparatus 200, the screen indicated by reference sign 3B in FIG. 3 is displayed on the display device 150 of the image forming apparatus 100. On this screen, a user is notified about how to cut the sheet of paper P.

Furthermore, the same screen as the screen indicated by reference sign 3B in FIG. 3 is also displayed on the display device 250 of the paper processing apparatus 200 to notify the user about how to cut the sheet of paper P.

Whether or not a sheet of paper P is present in both of the image forming apparatus 100 and the paper processing apparatus 200 is determined, for example, on the basis of a distance over which the sheet of paper P has been fed toward the paper processing apparatus 200 by the upstream-side transport unit 110.

Specifically, in a case where the distance over which the sheet of paper P has been fed is larger than a predetermined distance, the control device 170 of the image forming apparatus 100 determines that the sheet of paper P is present in both of the image forming apparatus 100 and the paper processing apparatus 200.

In this case, information indicating that the sheet of paper P is present in both of the image forming apparatus 100 and the paper processing apparatus 200 is transmitted to the control device 270 of the paper processing apparatus 200. Then, a user is notified on both of the image forming apparatus 100 and the paper processing apparatus 200 about how to cut the sheet of paper P.

In the present exemplary embodiment, the distance over which a sheet of paper P has been fed toward the paper processing apparatus 200 by the upstream-side transport unit 110 is grasped on the basis of an elapsed time from detection of a front end of the sheet of paper P by the downstream paper detection sensor S3 (see FIG. 1) to stoppage of transport of the sheet of paper P.

The distance over which the sheet of paper P has been fed becomes larger as this elapsed time becomes longer. In the present exemplary embodiment, in a case where this elapsed time is longer than a predetermined time, it is determined that the sheet of paper P is present in both of the image forming apparatus 100 and the paper processing apparatus 200, and a user is notified about how to cut the sheet of paper P.

Alternatively, whether or not a sheet of paper P is present in both of the image forming apparatus 100 and the paper processing apparatus 200 may be determined on the basis of output from the downstream paper detection sensor S3 and output from the upstream paper detection sensor X1.

More specifically, it may be determined that a sheet of paper P is present in both of the image forming apparatus 100 and the paper processing apparatus 200 in a case where the sheet of paper P whose transport has been stopped is being detected by both of the downstream paper detection sensor S3 and the upstream paper detection sensor X1.

Then (after the user is notified about how to cut the sheet of paper P), in the present exemplary embodiment, the user actually cuts the sheet of paper P by operating the cutting blade K2 (see FIG. 1).

In the present exemplary embodiment, when the sheet of paper P is cut by the cutting blade K2, the display device 150, which is an example of a notification unit, notifies the user about how to deal with a cut piece of paper P in the image forming apparatus 100 (see reference sign 3C in FIG. 3).

In the present exemplary embodiment, when the sheet of paper P is cut by the cutting blade K2, the display device 250 of the paper processing apparatus 200 also notifies the user about how to deal with a cut piece of paper P in the paper processing apparatus 200 (see reference sign 3D).

In the present exemplary embodiment, to deal with the cut pieces of paper P in the image forming apparatus 100 and the paper processing apparatus 200, the user first opens the exterior members to expose transport paths on which the sheet of paper P is transported. Then, the user manually removes the cut pieces of paper P on the transport paths.

Notifying the user about how to deal with the cut piece of paper P is notifying the user about a procedure for manually removing the cut piece of paper P. In other words, a procedure for manually removing the cut piece of paper P is displayed (see reference signs 3C and 3D).

In the present exemplary embodiment, whether or not a sheet of paper P has been cut by the cutting blade K2 is determined on the basis of output from the two cutting blade detection sensors SK (see FIG. 1).

More specifically, in the present exemplary embodiment, it is determined that a sheet of paper P has been cut by the cutting blade K2 in a case where there occurs a shift from a state where the cutting blade K2 is being detected by the cutting blade detection sensor SK1 to a state where the cutting blade K2 is being detected by the cutting blade detection sensor SK2 or a shift from a state where the cutting blade K2 is being detected by the cutting blade detection sensor SK2 to a state where the cutting blade K2 is being detected by the cutting blade detection sensor SK1.

In the present exemplary embodiment, when a sheet of paper P is cut, the sheet of paper P is divided into two pieces of paper.

To notify the user about how to deal with the sheet of paper P in the image forming apparatus 100, the display device 150 of the image forming apparatus 100 notifies the user about how to deal with one of these two cut pieces of paper that is present in the image forming apparatus 100.

Meanwhile, to notify the user about how to deal with the sheet of paper P in the paper processing apparatus 200, the display device 250 of the paper processing apparatus 200 notifies the user about how to deal with the other one of these two cut pieces of paper that is present in the paper processing apparatus 200.

In the present exemplary embodiment, the display device 150 of the image forming apparatus 100, which notifies the user about how to deal with the cut piece of paper P in the image forming apparatus 100, does not notifies the user about how to deal with the cut piece of paper P in the paper processing apparatus 200.

The user is notified about how to deal with the cut piece of paper P in the paper processing apparatus 200 by the display device 250 of the paper processing apparatus 200 (see reference sign 3D).

Similarly, the display device 250 of the paper processing apparatus 200, which notifies the user about how to deal with the cut piece of paper P in the paper processing apparatus 200, does not notify the user about how to deal with the cut piece of paper P in the image forming apparatus 100.

The user is notified about how to deal with the cut piece of paper P in the image forming apparatus 100 by the display device 150 of the image forming apparatus 100 (see reference sign 3C).

If the display device 150 of the image forming apparatus 100 notifies the user about how to deal with the cut piece of paper P in the paper processing apparatus 200 or the display device 250 of the paper processing apparatus 200 notifies the user about how to deal with the cut piece of paper P in the image forming apparatus 100, a lot of information is displayed on the screens displayed on the display device 150 and the display device 250. This makes it hard for an operator to grasp what kind of action should be taken.

In the present exemplary embodiment, in which the display device 150 does not notify the user about how to deal with the cut piece of paper P in the paper processing apparatus 200 and the display device 250 does not notify the user about how to deal with the cut piece of paper P in the image forming apparatus 100, user-friendly screens are displayed on the display device 150 and the display device 250. This improves workability of the operator.

Although how to deal with the cut piece of paper P in the image forming apparatus 100 and how to deal with the cut piece of paper P in the paper processing apparatus 200 may be displayed on a common screen, a lot of information is displayed on the screen also in this case. This makes it hard for an operator to grasp what kind of action should be taken.

Furthermore, if how to deal with the cut piece of paper P in the image forming apparatus 100 and how to deal with the cut piece of paper P in the paper processing apparatus 200 are displayed on a common screen, an operator needs to move to the common screen, for example, to check how to deal with the cut pieces of paper P. This tends to make workability poor.

According to the present exemplary embodiment, in which the user is notified about how to deal with the cut piece of paper P on both of the two display devices, worker's workability is improved as compared with a case where the user is notified about how to deal with the cut pieces of paper P on a common screen.

In the present exemplary embodiment, the user is notified about how to deal with the cut piece of paper P on the condition that the user has been notified about how to cut the sheet of paper P and the sheet of paper P has been actually cut.

Note, however, that this configuration is not restrictive. The user may be notified about how to deal with the cut piece of paper P only on the condition that the sheet of paper P has been actually cut. In particular, even in a case where the user is not notified about how to cut the sheet of paper P, the user may be notified about how to deal with the cut piece of paper P as long as the sheet of paper P has been cut.

In a case where the user has finished dealing with the cut piece of paper P in the image forming apparatus 100, a screen indicated by reference sign 3E in FIG. 3 is displayed on the display device 150.

In a case where the user has finished dealing with the cut piece of paper P in the image forming apparatus 100, the display device 150 finishes notifying the user about how to deal with the cut piece of paper P in the image forming apparatus 100.

In other words, in a case where the user finishes dealing with the cut pieces of paper P in the image forming apparatus 100, the display device 150 finishes notifying the user about how to deal with the cut piece of paper P in the image forming apparatus 100 and changes the screen showing how to deal with the cut piece of paper P to another screen indicated by reference sign 3E.

In the present exemplary embodiment, whether or not the user has finished dealing with the cut piece of paper P in the image forming apparatus 100 is determined, for example, on the basis of output from the paper detection sensors S (see FIG. 1).

For example, in a case where output from each of the paper detection sensors S indicates that there is no sheet of paper P, the control device 170 of the image forming apparatus 100 determines that the user has finished dealing with the cut piece of paper P in the image forming apparatus 100.

FIG. 3 illustrates a display example in a case where the user has not finished dealing with the cut piece of paper P in the paper processing apparatus 200 when the user finishes dealing with the cut piece of paper P in the image forming apparatus 100.

In this case, the display device 250 of the paper processing apparatus 200 continues to notify the user about how to deal with the cut piece of paper P in the paper processing apparatus 200 (see reference sign 3F).

In particular, in the example illustrated in FIG. 3, the user deals with the cut piece of paper P in the image forming apparatus 100 earlier. This creates a situation where the user has finished dealing with the cut piece of paper P in the image forming apparatus 100 earlier but has not finished dealing with the cut piece of paper P in the paper processing apparatus 200.

In such a situation where the user has not finished dealing with the cut piece of paper P in the paper processing apparatus 200, the display device 250 of the paper processing apparatus 200 continues to notify the user about how to deal with the cut piece of paper P in the paper processing apparatus 200 (see reference sign 3F).

In a case where the user has finished dealing with the cut piece of paper P in the image forming apparatus 100, the display device 150 of the image forming apparatus 100 finishes notifying the user about how to deal with the cut piece of paper P in the image forming apparatus 100 and switches to another screen (see reference sign 3E).

In this example, on this screen, the display device 150 of the image forming apparatus 100 gives a notification about the paper processing apparatus 200, which is the other apparatus.

More specifically, on this screen, the display device 150 of the image forming apparatus 100 gives a notification prompting the user to refer to a notification given on the display device 250 of the paper processing apparatus 200.

Furthermore, on this screen, the display device 150 of the image forming apparatus 100 gives a notification prompting the user to deal with the cut piece of paper P in the paper processing apparatus 200.

More specifically, the display device 150 of the image forming apparatus 100 displays "CHECK UI OF PAPER PROCESSING APPARATUS AND REMOVE PAPER IN PAPER PROCESSING APPARATUS." prompting the user to refer to the display device 250 of the paper processing apparatus 200 and to deal with the cut piece of paper P in the paper processing apparatus 200. The "UI" means the display device 250.

Although a case where two notifications, that is, a notification prompting the user to refer to a notification given on the display device 250 of the paper processing apparatus 200 and a notification prompting the user to deal with the cut piece of paper P in the paper processing apparatus 200 are given has been described in the present exemplary embodiment, only one of the notifications may be given.

Then, the display device 150 of the image forming apparatus 100 switches from the screen for the notification about the paper processing apparatus 200 to another screen (see reference sign 3G in FIG. 3).

More specifically, the display device 150 of the image forming apparatus 100 switches from the screen for the notification about the paper processing apparatus 200 to an initial screen.

In particular, in the present exemplary embodiment, the initial screen is a menu screen, and the display device 150 of the image forming apparatus 100 switches from the screen for the notification about the paper processing apparatus 200 to the menu screen.

In other words, the display device 150 of the image forming apparatus 100 switches from the screen for the notification about the paper processing apparatus 200 to a screen other than the screen for the notification about the paper processing apparatus 200.

The "menu screen" as used herein refers to a screen referred by a user when the user selects processing from among plural kinds of processing that are executable in the paper processing system 1.

In the present exemplary embodiment, the switching to the initial screen is performed in a case where a predetermined condition is met, and the switching to the initial screen is not performed in a case where this predetermined condition is not met.

More specifically, in the present exemplary embodiment, the switching to the initial screen is performed in a case where the user has finished dealing with both of the cut piece of paper P in the image forming apparatus 100 and the cut piece of paper in the paper processing apparatus 200.

Meanwhile, the switching to the initial screen is not performed in a case where the user has finished dealing with the cut piece of paper in the image forming apparatus 100 but has not finished dealing with the cut piece of paper P in the paper processing apparatus 200.

FIG. 4 is a view for explaining what is displayed on the display device 250 of the paper processing apparatus 200.

FIG. 4 illustrates what is displayed in a case where the user deals with the sheet of paper P that has stopped in the paper processing apparatus 200 earlier than the sheet of paper P that has stopped in the image forming apparatus 100.

In FIG. 4, what is displayed on the display device 150 of the image forming apparatus 100 is also illustrated (see reference sign 4A).

In the present exemplary embodiment, transport of a sheet of paper P by the upstream-side transport unit 110 and the downstream-side transport unit 210 is sometimes stopped when the sheet of paper P is present in both of the image forming apparatus 100 and the paper processing apparatus 200 as described above.

In this case, the display device 250 of the paper processing apparatus 200 first notifies a user about how to cut the sheet of paper P that is present in both of the image forming apparatus 100 and the paper processing apparatus 200 (see reference sign 4B), as in the above case.

In the present exemplary embodiment, the user is also notified about how to cut the sheet of paper P on the display device 150 of the image forming apparatus 100 as described above. That is, in the present exemplary embodiment, the user is notified on both of the image forming apparatus 100 and the paper processing apparatus 200 about how to cut the sheet of paper P.

In the present exemplary embodiment, the same screen is displayed on the image forming apparatus 100 and the paper processing apparatus 200 (see reference sign 3B in FIG. 3 and reference sign 4B in FIG. 4) to notify the user about how to cut the sheet of paper P.

Although a case where the user is notified on both of the image forming apparatus 100 and the paper processing apparatus 200 about how to cut the sheet of paper P has been described in the present exemplary embodiment, the user may be notified on only one of the image forming apparatus 100 and the paper processing apparatus 200 about how to cut the sheet of paper P.

Then, in the present exemplary embodiment, the user cuts the sheet of paper P by operating the cutting blade K2 as described above.

In the present exemplary embodiment, when the sheet of paper P is cut, the display device 250 of the paper processing apparatus 200 switches to a screen on which the user is notified about how to deal with the cut piece of paper P in the paper processing apparatus 200 (see reference sign 4C).

Specifically, the display device 250 of the paper processing apparatus 200 notifies the user about how to deal with a piece of paper on the paper processing apparatus 200 side that is one of two pieces of paper generated by cutting the sheet of paper P.

In particular, in the present exemplary embodiment, the display device 250 of the paper processing apparatus 200 notifies the user about how to deal with the cut piece of paper P in the paper processing apparatus 200 in a case where the user has been notified about how to cut the sheet of paper P and the sheet of paper P has been actually cut.

More specifically, the display device 250 of the paper processing apparatus 200 notifies the user about how to deal with the cut piece of paper P in the paper processing apparatus 200 by displaying an image showing the paper processing apparatus 200 and a procedure for dealing with the cut piece of paper P (see reference sign 4C in FIG. 4).

More specifically, in the present exemplary embodiment, the user exposes the transport path on which the sheet of paper P is transported by opening the exterior member to deal with the cut piece of paper P as described above. Then, the user manually removes the cut piece of paper P on this transport path.

The display device 250 of the paper processing apparatus 200 displays a procedure of the user's manual removal of the cut piece of paper P.

The display device 250 of the paper processing apparatus 200, which notifies the user about how to deal with the cut piece of paper P in the paper processing apparatus 200, does not notify the user about how to deal with the cut piece of paper P in the image forming apparatus 100, which is an example of another apparatus.

The user is notified about how to deal with the cut piece of paper P in the image forming apparatus 100 by the display device 150 of the image forming apparatus 100 (see reference sign 4D).

In this display example, the user is notified about how to deal with the cut piece of paper P on the condition that the user has been notified about how to cut the sheet of paper P and the sheet of paper P has been actually cut, as in the above case.

Alternatively, even in a case where the user is not notified about how to cut the sheet of paper P, the user may be notified about how to deal with the cut piece of paper P as long as the sheet of paper P has been cut, as in the above case.

Reference sign 4E in FIG. 4 indicates a screen displayed on the display device 250 in a case where the user has finished dealing with the cut piece of paper P in the paper processing apparatus 200.

In a case where the user has finished dealing with the cut piece of paper P in the paper processing apparatus 200, the display device 250 of the paper processing apparatus 200 finishes notifying the user about how to deal with the cut piece of paper P in the paper processing apparatus 200.

In other words, the display device 250 finishes notifying the user about how to deal with the cut piece of paper P in the paper processing apparatus 200 by switching from the screen showing how to deal with the cut piece of paper P in the paper processing apparatus 200 to another screen (see reference sign 4E).

On this screen, the display device 250 of the paper processing apparatus 200 gives a notification about the image forming apparatus 100, which is another apparatus.

More specifically, on this screen, the display device 250 of the paper processing apparatus 200 gives, as the notification about the image forming apparatus 100, a notification prompting the user to refer to the notification given by the display device 150 of the image forming apparatus 100. Furthermore, on this screen, the display device 250 of the paper processing apparatus 200 gives a notification prompting the user to deal with the cut piece of paper P in the image forming apparatus 100.

More specifically, the display device 250 of the paper processing apparatus 200 displays "CHECK UI OF IMAGE FORMING APPARATUS AND REMOVE PAPER IN IMAGE FORMING APPARATUS." prompting the user to refer to the display device 150 of the image forming apparatus 100 and prompting the user to deal with the cut piece of paper P in the image forming apparatus 100.

Although a case where two notifications, specifically, a notification prompting the user to refer to the notification given by the display device 150 of the image forming apparatus 100 and a notification prompting the user to deal with the cut piece of paper P in the image forming apparatus 100 are given in the present exemplary embodiment, only one of the notifications may be given.

FIG. 4 illustrates a display example in a case where the user has not finished dealing with the cut piece of paper P in the image forming apparatus 100 when the user finishes dealing with the cut piece of paper P in the paper processing apparatus 200.

In this case, the display device 250 of the paper processing apparatus 200 gives a notification about the image forming apparatus 100 (see reference sign 4E).

More specifically, the display device 250 of the paper processing apparatus 200 gives two notifications, specifically, a notification prompting the user to refer to the notification given by the display device 150 of the image forming apparatus 100 and a notification prompting the user to deal with the cut piece of paper P in the image forming apparatus 100.

In the present exemplary embodiment, when these two notifications are given, the notification about how to deal with the cut piece of paper P is being given on the display device 150 of the image forming apparatus 100 (see reference sign 4F).

This allows the user to grasp how to deal with the cut piece of paper P in the image forming apparatus 100 by referring to the display device 150 of the image forming apparatus 100 after these two notifications are given.

Then, an initial screen (start screen) is displayed on the display device 250 of the paper processing apparatus 200 (see reference sign 4G).

In particular, in the present exemplary embodiment, when the user finishes dealing with the cut piece of paper P in the paper processing apparatus 200 and finishes dealing with the cut piece of paper P in the image forming apparatus 100, the screen indicated by reference sign 4E switches to the initial screen indicated by reference sign 4G.

In particular, in the present exemplary embodiment, the switching to the initial screen is not performed in the paper processing apparatus 200 in a case where the user has finished dealing with the cut piece of paper P in the paper processing apparatus 200 but has not finished dealing with the cut piece of paper P in the image forming apparatus 100.

In the present exemplary embodiment, the switching to the initial screen is performed in a case where the user has finished dealing with the cut piece of paper P in the paper processing apparatus 200 and has finished dealing with the cut piece of paper P in the image forming apparatus 100.

In the present exemplary embodiment, what kind of processing is performed in the paper processing apparatus 200 is displayed on the initial screen indicated by reference sign 4G. In particular, what kind of processing is performed on the sheet of paper P in the paper processing apparatus 200 is displayed on this initial screen.

More specifically, in the present exemplary embodiment, folding processing is performed in the paper processing apparatus 200, and an image of a folded sheet of paper P is displayed on the initial screen.

FIG. 5 is a flowchart illustrating flow of processing performed by the control device 170 of the image forming apparatus 100.

More specifically, FIG. 5 is a flowchart illustrating flow of processing performed by the control device 170 of the image forming apparatus 100 in a case where a sheet of paper P that has stopped is present in both of the image forming apparatus 100 and the paper processing apparatus 200.

In particular, FIG. 5 is a flowchart illustrating flow of the display processing illustrated in FIG. 3 performed by the control device 170.

In a case where a sheet of paper P that has stopped is present in both of the image forming apparatus 100 and the paper processing apparatus 200, the control device 170 of the image forming apparatus 100 first controls the display device 150 of the image forming apparatus 100 to notify a user about how to cut the sheet of paper P (step S101).

More specifically, the control device 170 notifies the user about how to cut the sheet of paper P by displaying an image showing the image forming apparatus 100 and the paper processing apparatus 200 and a specific procedure for cutting the sheet of paper P (see reference sign 3B in FIG. 3).

Then, the control device 170 of the image forming apparatus 100 determines whether or not the sheet of paper P has been cut by the cutting blade K2 (step S102).

In a case where the control device 170 determines that the sheet of paper P has been cut by the cutting blade K2, the control device 170 notifies the user about how to deal with the cut piece of paper P in the image forming apparatus 100 (step S103).

In this case, in the present exemplary embodiment, the control device 270 of the paper processing apparatus 200 also notifies the user about how to deal with the cut piece of paper P in the paper processing apparatus 200.

Next, the control device 170 of the image forming apparatus 100 determines whether or not the user has finishes dealing with the cut piece of paper P in the image forming apparatus 100 (step S104). More specifically, the control device 170 determines whether or not the user has removed the cut piece of paper P that is present in the image forming apparatus 100.

In a case where the control device 170 of the image forming apparatus 100 determines that the user has finished dealing with the cut piece of paper P, the control device 170 acquires, from the paper processing apparatus 200, information on progress which the user is making in dealing with the cut piece of paper P in the paper processing apparatus 200 (step S105).

More specifically, the control device 170 of the image forming apparatus 100 acquires the information on the progress by making an inquiry to the paper processing apparatus 200.

Then, the control device 170 determines whether or not the user has finished dealing with the cut piece of paper P in the paper processing apparatus 200 (step S106). In a case where the control device 170 determines that the user has not finished dealing with the cut piece of paper P in the paper processing apparatus 200, the control device 170 gives a notification about the paper processing apparatus 200 as described above (step S107).

Specifically, the control device 170 gives a notification prompting the user to refer to the notification given by the display device 250 of the paper processing apparatus 200 and a notification prompting the user to deal with the cut piece of paper P in the paper processing apparatus 200.

Then, the control device 170 acquires information indicating that the user has finished dealing with the cut piece of paper P from the paper processing apparatus 200 (step S108).

In particular, in the present exemplary embodiment, when the user finishes dealing with the cut piece of paper P in the paper processing apparatus 200, information indicating that the user has finished dealing with the cut piece of paper P is transmitted from the control device 270 of the paper processing apparatus 200 to the control device 170 of the image forming apparatus 100. In step S108, the control device 170 acquires the information indicating that the user has finished dealing with the cut piece of paper P.

When the control device 170 acquires information indicating that the user has finished dealing with the cut piece of paper P, the control device 170 changes the screen displayed on the display device 150 of the image forming apparatus 100 to the initial screen (step S109).

In other words, when the process in step S108 is finished, the control device 170 switches the screen displayed on the display device 150 from the screen about the paper processing apparatus 200 to the initial screen.

In the present exemplary embodiment, also in a case where it is determined in step S106 that the user has finished dealing with the cut piece of paper P in the paper processing apparatus 200, the process in step S109 is performed, in which the control device 170 displays the initial screen.

In a case where it is determined in step S106 that the user has finished dealing with the cut piece of paper in the paper processing apparatus 200, the process in step S109 is performed while omitting the processes in steps S107 and S108.

In this case, the initial screen is displayed while omitting displaying the screen about the paper processing apparatus 200.

FIG. 6 is a flowchart illustrating flow of processing performed by the control device 270 of the paper processing apparatus 200.

More specifically, FIG. 6 is a flowchart illustrating flow of processing performed by the control device 270 of the paper processing apparatus 200 in a case where a sheet of paper P that has stopped is present in both of the image forming apparatus 100 and the paper processing apparatus 200.

In particular, FIG. 6 is a flowchart illustrating flow of the display processing illustrated in FIG. 4 performed by the control device 270.

In a case where a sheet of paper P that has stopped is present in both of the image forming apparatus 100 and the paper processing apparatus 200, the control device 270 of the paper processing apparatus 200 first controls the display device 250 to notify the user about how to cut this sheet of paper P (step S201).

More specifically, the control device 270 notifies the user about how to cut this sheet of paper P by displaying an image showing the image forming apparatus 100 and the paper processing apparatus 200 and a specific procedure for cutting the sheet of paper P (see reference sign 4B in FIG. 4).

In the present exemplary embodiment, the screen displayed by the control device 270 in step S201 and the screen displayed by the control device 170 of the image forming apparatus 100 in step S101 are the same. That is, in the present exemplary embodiment, the same screen is displayed on the image forming apparatus 100 and the paper processing apparatus 200.

In particular, in the present exemplary embodiment, the same screen is displayed on the image forming apparatus 100 and the paper processing apparatus 200 to notify the user about how to cut the sheet of paper P.

Then, the control device 270 of the paper processing apparatus 200 determines whether or not the user has finished cutting the sheet of paper P by the cutting blade K2 (step S202). In a case where the control device 270 determines that the user has finished cutting the sheet of paper P by the cutting blade K2, the control device 270 notifies the user about how to deal with the cut piece of paper P in the paper processing apparatus 200 (step S203).

In this case, in the present exemplary embodiment, the process in step S103 in FIG. 5 is also performed, in which the control device 170 of the image forming apparatus 100 notifies the user about how to deal with the cut piece of paper P in the image forming apparatus 100.

Next, the control device 270 of the paper processing apparatus 200 determines whether or not the user has finished dealing with the cut piece of paper P in the paper processing apparatus 200 (step S204). More specifically, the control device 270 determines whether or not the user has finished removing the cut piece of paper P that is present in the paper processing apparatus 200.

In a case where the control device 270 determines that the user has finished dealing with the cut piece of paper P, the control device 270 acquires, from the image forming apparatus 100, information about progress which the user is making in dealing with the cut piece of paper P in the image forming apparatus 100 (step S205).

Then, the control device 270 determines whether or not the user has finished dealing with the cut piece of paper P in the image forming apparatus 100 (step S206). In a case where the control device 270 determines that the user has not finished dealing with the cut piece of paper P in the image forming apparatus 100, the control device 270 gives a notification about the image forming apparatus 100 (step S207).

Specifically, the control device 270 gives, as the notification about the image forming apparatus 100, a notification prompting the user to refer to a notification given by the display device 150 of the image forming apparatus 100 as described above. Furthermore, the control device 270 gives a notification prompting the user to deal with the cut piece of paper P in the image forming apparatus 100.

Then, the control device 270 of the paper processing apparatus 200 acquires, from the image forming apparatus 100, information indicating that the user has finished dealing with the cut piece of paper P in the image forming apparatus 100 (step S208).

In particular, in the present exemplary embodiment, when the user finishes dealing with the cut piece of paper P in the image forming apparatus 100, information indicating that the user has finishes dealing with the cut piece of paper P is transmitted from the control device 170 of the image forming apparatus 100 to the control device 270 of the paper processing apparatus 200. The control device 270 acquires this information indicating that the user has finished dealing with the cut piece of paper P.

When the control device 270 acquires the information indicating that the user has finished dealing with the cut piece of paper P, the control device 270 changes the screen displayed on the display device 250 of the paper processing apparatus 200 to the initial screen (step S209). In other words, when the process in step S208 is finished, the control device 270 switches the screen displayed on the display device 250 from the screen about the image forming apparatus 100 to the initial screen. More specifically, the control device 270 switches from the screen about the image forming apparatus 100 to the initial screen indicated by reference sign 4G in FIG. 4.

In the present exemplary embodiment, also in a case where the control device 270 determines in step S206 that the user has finished dealing with the cut piece of paper P in the image forming apparatus 100, the control device 270 switches to the initial screen.

Note that in a case where the control device 270 determines in step S206 that the user has finished dealing with the cut piece of paper P in the image forming apparatus 100, the process in step S209 is performed while omitting the processes in steps S207 and S208.

In this case, the initial screen is displayed while omitting displaying the screen about the image forming apparatus 100.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A recording material transport system comprising:
a first transport apparatus including a transport unit that transports a first recording material and a notification unit that notifies a user about how to deal with the first recording material whose transport by the transport unit has been stopped; and
a second transport apparatus including a transport unit that transports the first recording material transported from the first transport apparatus and a notification unit that notifies the user about how to deal with the first recording material whose transport by the transport unit has been stopped,
wherein in response to determining that the first recording material has stopped in the first transport apparatus and the same first recording material has stopped in the second transport apparatus at the same time, the notification unit of the first transport apparatus notifies the user about how to deal with the first recording material in the first transport apparatus, and the notification unit of the second transport apparatus notifies the user about how to deal with the first recording material in the second transport apparatus.

2. The recording material transport system according to claim 1, wherein
the notification unit of the first transport apparatus does not notify the user about how to deal with the first recording material in the second transport apparatus, and the notification unit of the second transport apparatus does not notify the user about how to deal with the first recording material in the first transport apparatus.

3. The recording material transport system according to claim 1, wherein
the user is notified on one of or both of the first transport apparatus and the second transport apparatus about how to cut the first recording material that is present in both of the first transport apparatus and the second transport apparatus; and
the notification unit of the first transport apparatus and the notification unit of the second transport apparatus notify the user about how to deal with the first recording material after the user is notified about how to cut the first recording material.

4. The recording material transport system according to claim 3, wherein
the notification unit of the first transport apparatus and the notification unit of the second transport apparatus notify the user about how to deal with the first recording material in a case where the user has been notified about how to cut the first recording material and the first recording material has been actually cut.

5. The recording material transport system according to claim 3, wherein
a screen notifying the user about how to cut the first recording material is displayed on both of the first transport apparatus and the second transport apparatus.

6. The recording material transport system according to claim 1, wherein
the notification unit of the first transport apparatus and the notification unit of the second transport apparatus notify the user about how to deal with the first recording material after the first recording material is cut.

7. The recording material transport system according to claim 1, wherein
in a case where the user has finished dealing with the first recording material in one of the first transport apparatus and the second transport apparatus, the notification unit of the one of the first transport apparatus and the second transport apparatus finishes notifying the user about how to deal with the first recording material in the one of the first transport apparatus and the second transport apparatus.

8. The recording material transport system according to claim 7, wherein
in a case where the user has finished dealing with the first recording material in the one of the first transport apparatus and the second transport apparatus and the user has not finished dealing with the first recording material in the other one of the first transport apparatus and the second transport apparatus, the notification unit of the other one of the first transport apparatus and the second transport apparatus continues to notify the user about how to deal with the first recording material in the other one of the first transport apparatus and the second transport apparatus.

9. The recording material transport system according to claim 1, wherein
in a case where the user has finished dealing with the first recording material in one of the first transport apparatus and the second transport apparatus, the notification unit of the one of the first transport apparatus and the second transport apparatus gives a notification about the other one of the first transport apparatus and the second transport apparatus.

10. The recording material transport system according to claim 9, wherein
the notification about the other one of the first transport apparatus and the second transport apparatus includes a notification prompting the user to refer to a notification given by the notification unit of the other one of the first transport apparatus and the second transport apparatus.

11. The recording material transport system according to claim 9, wherein
the notification about the other one of the first transport apparatus and the second transport apparatus includes a notification prompting the user to deal with the first recording material in the other one of the first transport apparatus and the second transport apparatus.

12. The recording material transport system according to claim 1, wherein
the notification unit of the first transport apparatus switches from a screen notifying the user about how to deal with the first recording material to another screen in a case where the user has finished dealing with the first recording material in the first transport apparatus, and the notification unit of the second transport apparatus switches from a screen notifying the user about how to deal with the first recording material to another screen in a case where the user has finished dealing with the first recording material in the second transport apparatus; and
in a case where the user has finished dealing with the first recording material in one of the first transport apparatus and the second transport apparatus and has not finished dealing with the first recording material in the other one of the first transport apparatus and the second transport apparatus, the switching to the other screen is not performed in the one of the first transport apparatus and the second transport apparatus.

13. A recording material transport apparatus that is connectable to another apparatus and executes a job together with the other apparatus in a case where the recording material transport apparatus is connected to the other apparatus, the recording material transport apparatus comprising:
- a transport unit that transports a first recording material transported from the other apparatus or transports the first recording material to be fed to the other apparatus; and
- a notification unit that notifies a user about how to deal with the first recording material whose transport by the transport unit has been stopped,
- wherein in response to determining that the first recording material has stopped in the other apparatus and the same first recording material has stopped in the recording material transport apparatus at the same time, the notification unit notifies a user about how to deal with the first recording material in the recording material transport apparatus but does not notify the user about how to deal with the first recording material in the other apparatus.

14. The recording material transport apparatus according to claim 13, wherein
the notification unit gives a notification about the other apparatus in a case where the user has finished dealing with the first recording material in the recording material transport apparatus.

15. The recording material transport apparatus according to claim 14, wherein
the notification about the other apparatus includes a notification prompting the user to refer to a notification given by a notification unit of the other apparatus and/or a notification prompting the user to deal with the first recording material in the other apparatus.

16. The recording material transport apparatus according to claim 13, wherein
the notification unit notifies the user about how to deal with the first recording material in a case where the first recording material present in both of the other apparatus and the recording material transport apparatus has been cut.

17. The recording material transport apparatus according to claim 13, wherein
the notification unit switches from a screen notifying the user about how to deal with the first recording material to another screen in a case where the user has finished dealing with the first recording material in the recording material transport apparatus; and
the switching to the other screen is not performed in the recording material transport apparatus in a case where the user has finished dealing with the first recording material in the recording material transport apparatus and has not finished dealing with the first recording material in the other apparatus.

18. An image forming apparatus comprising:
an image forming unit that forms an image on the first recording material; and
a recording material transport apparatus that transports the first recording material,
wherein the recording material transport apparatus is the recording material transport apparatus according to claim 13.

* * * * *